US007353708B2

(12) United States Patent
Young et al.

(10) Patent No.: US 7,353,708 B2

(45) Date of Patent: Apr. 8, 2008

(54) ULTRASONIC GENERATOR SYSTEM

(76) Inventors: Michael John Radley Young, Bremridge House, Bremridge, Ashburton, Newton Abbot, South Devon, TQ13 7JX (GB); Stephen Michael Radley Young, Bremridge House, Bremridge, Ashburton, Newton Abbot, South Devon, TQ13 7JX (GB); Neil Christopher Pearse, Waye Farm, Woodland, Ashburton, Newton Abbot, South Devon, TQ13 7LL (GB)

( * ) Notice: Subject to any disclaimer, the term of this patent is extended or adjusted under 35 U.S.C. 154(b) by 93 days.

(21) Appl. No.: 10/497,629

(22) PCT Filed: Dec. 5, 2002

(86) PCT No.: PCT/GB02/05546

§ 371 (c)(1),
(2), (4) Date: Jan. 26, 2005

(87) PCT Pub. No.: WO03/047769

PCT Pub. Date: Jun. 12, 2003

(65) Prior Publication Data

US 2005/0117450 A1 Jun. 2, 2005

(30) Foreign Application Priority Data

Dec. 5, 2001 (GB) ................................ 0129139.2

(51) Int. Cl.
*G01N 29/00* (2006.01)
*H04B 17/00* (2006.01)
*H02N 2/00* (2006.01)

(52) U.S. Cl. ........................... 73/579; 73/1.82; 73/597; 367/13; 310/316.01; 310/119

(58) Field of Classification Search ................. 73/1.82, 73/579, 597; 367/13; 433/119, 118; 310/316.01; 331/4
See application file for complete search history.

(56) References Cited

U.S. PATENT DOCUMENTS 4,333,028 A * 6/1982 Panton ........................ 310/326
4,687,962 A * 8/1987 Elbert .................... 310/316.01
4,748,365 A 5/1988 Poupaert et al.

(Continued)

FOREIGN PATENT DOCUMENTS

EP 1 014 575 A1 6/2000
GB 2 356 311 A 7/1999

*Primary Examiner*—Hezron Williams
*Assistant Examiner*—Jacques M. Saint-Surin
(74) *Attorney, Agent, or Firm*—Carter, DeLuca, Farrell & Schmidt, LLP

(57) ABSTRACT

The system controls the frequency of an ultrasonic signal to be applied to a waveguide, such that the frequency corresponds to a preferred resonance mode of the waveguide and not to adjacent undesirable resonance modes. The system operates by carrying out a first scan of a predetermined portion of the generated signal, determining the number of resonance modes of the waveguide within this portion and selecting from these resonance modes either that one mode which is at a central frequency or that one mode which is at a frequency nearest thereto. The system may also set limits on each side of the selected resonance mode and carry out a second scan within these limits each time that the generator is activated to check whether the selected resonance mode is drifting.

19 Claims, 4 Drawing Sheets

U.S. PATENT DOCUMENTS 4,966,131 A 10/1990 Houghton et al.
5,216,338 A * 6/1993 Wilson ........................ 318/116
5,343,865 A * 9/1994 Gardineer et al. .......... 600/461
5,523,058 A * 6/1996 Umemura et al. .......... 422/128
5,549,111 A * 8/1996 Wright et al. ............... 600/443
5,588,592 A * 12/1996 Wilson .......................... 239/4
5,636,179 A * 6/1997 Slomka ....................... 367/95
6,028,387 A 2/2000 Boukhny
6,236,276 B1 * 5/2001 Cewers .......................... 331/4
6,318,180 B1 * 11/2001 Humphrey et al. ........... 73/622
6,503,081 B1 * 1/2003 Feine ......................... 433/119
7,220,232 B2 * 5/2007 Suorsa et al. .................. 601/2

* cited by examiner

ULTRASONIC GENERATOR SYSTEM

PRIORITY

This application claims priority under 35 U.S.C. Section 120 from a PCT application filed on Dec. 5, 2002 and assigned PCT Application No. PCT/GB2002/05546 which claims priority from a patent application filed in the United Kingdom on Dec. 5, 2001 and assigned Application No. GB0129139.2.

BACKGROUND OF THE INVENTION

The present invention relates to an ultrasonic generator system. More particularly, but not exclusively it relates to a generator system able to achieve and maintain a resonant torsional frequency to be applied to a waveguide.

A torsional waveguide has a large number of natural frequencies, only a few of which are useful. The majority of resonant conditions are in a flexural mode, which is not desirable.

Ideally, a conventional drive circuit could power an elongate thin torsionally vibratable waveguide. However, there are difficulties where it is desired to use a unique torsional mode resonance as this would need to be separated by a frequency difference of at least 1.0 kHz from any alternative resonant modes for a conventional circuit to suffice. In practice, such waveguides display alternative resonant modes within a few hundred Hz of a desired mode.

It is known from European Patent Application No. 1025806A to provide an ultrasonic surgical device in which the circuitry stores a frequency for a resonant condition and restores the signal to that condition whenever it detects a non-resonant condition.

This is not a flexible arrangement and it is not ideally suited to torsional vibration modes.

It is therefore an object of the present invention to provide a system which includes an intelligent frequency generating control circuit.

SUMMARY OF THE INVENTION

According to a first aspect of the present invention, there is provided a method of generating an ultrasonic signal comprising the steps of carrying out a first scan of the generated signal over a predetermined portion of the signal; determining the number of resonance modes within the predetermined portion and the frequencies thereof; and selecting from said resonance modes either that one mode which is at a central frequency or that at a frequency nearest thereto.

Preferably, the method further comprises setting scanning limits on each side of the selected resonance mode.

Advantageously, said scanning limits cover a frequency range substantially smaller than said predetermined portion of the signal, optionally less than a tenth thereof.

Each time the generator is activated, the system may carry out a second scan within said scanning limits to select an optimum frequency therewithin.

During use of the system, the selected resonance mode may be tracked within close limits. Such tracking should account for frequency drifts due to thermal effects or changes in applied load.

The method may comprise the step of stopping generation of the signal in response to an error condition.

Said error condition may comprise a discontinuous change in the frequency of the selected resonance mode.

According to a second aspect of the present invention, there is provided an ultrasonic generator system comprising means for generating ultrasonic vibrations and control circuit means adapted for performing the method as described above.

Preferably, the system comprises a waveguide for said ultrasonic vibrations being operatively connected to the generating means.

Advantageously, the system comprises alerting means for alerting a user of errors during operation of the system.

Optionally, the alerting means may comprise display means, such as liquid crystal display means.

Alternatively or additionally, the alerting means may comprise audible alerting means.

Preferably, said ultrasonic vibrations are vibrations in a torsional mode.

BRIEF DESCRIPTION OF THE DRAWINGS

An embodiment of the present invention will now be more particularly described with reference to the accompanying drawings, in which.

DETAILED DESCRIPTION OF THE PREFERRED EMBODIMENTS

The system uses a microprocessor (not shown) with various interface A to D ports to monitor current waveforms, which allows detection of any resonance conditions in the mechanical system. The waveguides and close coupled transducer assemblies driven by the system are quite reproducible and each displays an undesirable resonance mode with in 200-400 Hz either side of the target torsional mode resonance. In almost all cases, the target mode is reproducible within 100-200 Hz between systems and usually has rejectable modes at either side.

In order to set up the system, the processor scans over a pre-set frequency range, noting the position of three resonance modes around the target frequency.

The centre mode is then selected, or if there are only two modes found, that closest to the target frequency is selected. The system then sets scanning limits on either side of the set target frequency to enable control of the chosen resonance mode. The window defined by these scanning limits usually covers a much smaller frequency range than the scan used to set up the system.

In the present embodiment, the waveguide is used intermittently, in short bursts. It is usual to operate the generator by means of a foot switch, although other methods may be used.

In this case, on each operation of the foot switch and thereby activation of the generator, the system will perform a second scan, checking only that there is a resonant mode within the window specified by the previously set scanning range. Should the frequency have moved slightly, a new optimum frequency will be set.

The system then enters a tracking phase which will continue for as long as the foot switch is depressed, or until an irredeemable error is discovered. This enables the system to take account of frequency drifts due to thermal effects, or changes in applied load.

The system comprises a LCD (liquid crystal display), on which system status and error messages are displayed. For example, if the waveguide, which may be the handset of a surgical instrument, is not correctly connected to the system at start-up, the message "NO HANDSET" is displayed.

In some cases, surgical instrument handset can become surface damaged if they contact bone, rather than soft tissues, which may alter the resonance modes of the waveguide. If such alteration is significant, it should be detected by either the second scan or the tracking phase as an error. In this case, the generator would be halted and the message "REPLACE HANDSET" would be displayed on the LCD. The system also has an audible warning, such as a buzzer, to correspond to these LCD messages.

Figure 1:
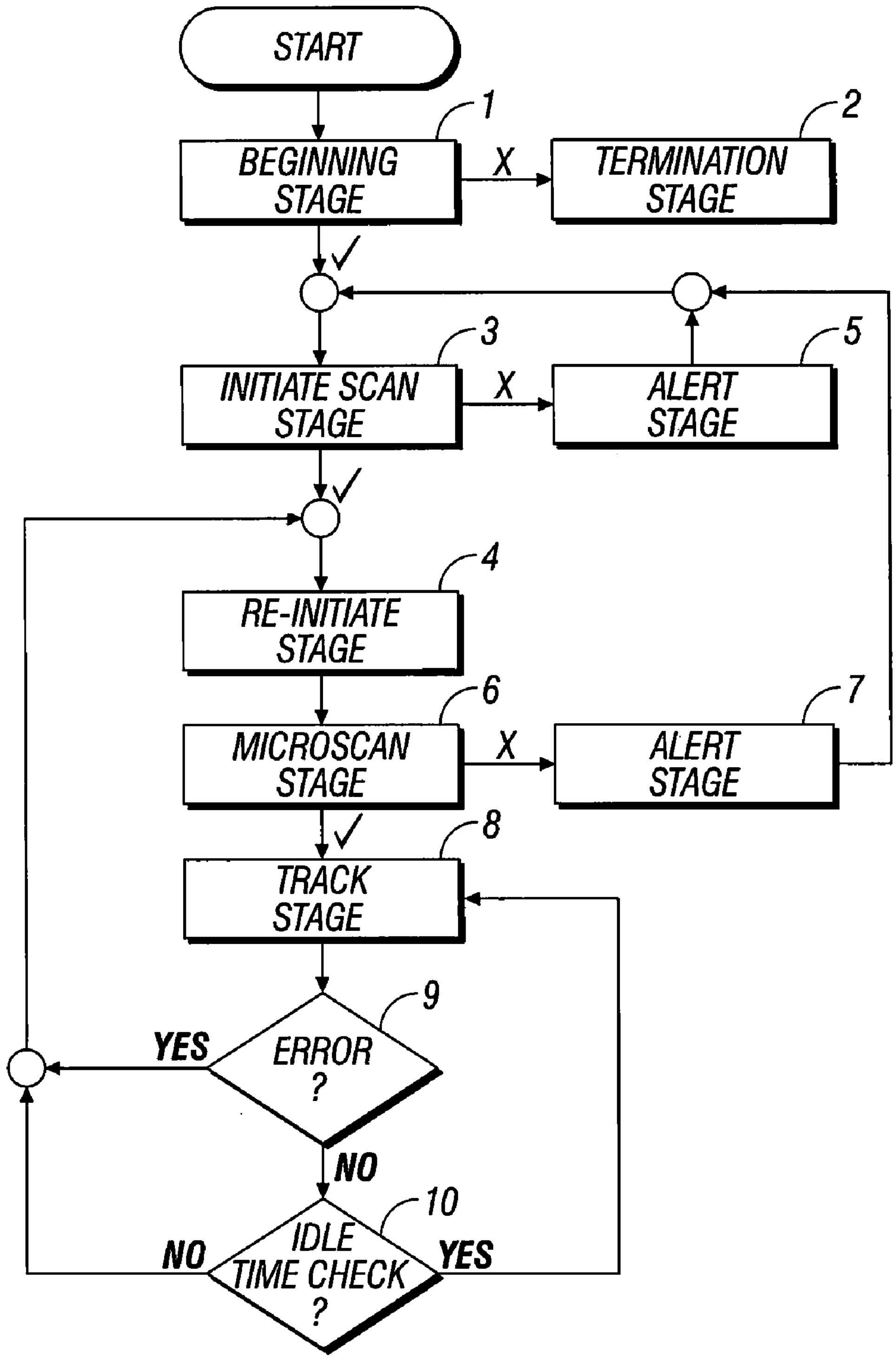
FIG. 1 shows schematically a block system of a control structure embodying the invention.

Referring now to FIG. 1 of the drawings, a control structure is shown, beginning at stage 1, in which the ports, an LCD and UART connections are set up. A message is displayed on the LCD to indicate that the system is ready. A system ready message and hardware set-up results are sent through UART for diagnostics purposes. If a serious hardware fault should be detected, stage 2 terminates the program and an error message is displayed pm the LCD, and diagnostics date area sent through UART.

If no serious hardware fault is detected, stage 3 initiates a scan to detect each dip within the operating window, measuring the magnitude. If a dip is found which satisfies the minimum magnitude requirement the state 3 scan returns success. A foot switch must be pressed for the duration of the stage 3 scan, which scan sets a window around the optimum operating frequency.

In the event that the stage 3 scan fails, an alert stage 5 acts to display an error message on the LCD, and sounds a buzzer to alert the user.

When the foot switch is pressed again at stage 4, a microscan stage 6 checks that there is only one dip within the window specified by the stage 3 scan. In this case the optimum frequency at which tracking (see below) will start is set. If not, a further alert stage 7 displays another error message on the LCD, and a buzzer is sounded to alert the user.

If the microscan stage 6 indicates success, there follows a track stage 8 in which the optimum frequency is followed whilst the transducer is in use. The track stage 8 terminates when the foot switch is released (to terminate operation of the transducer), or if an error is detected. If there is an error, as determined at stage 9, the system returns to stage 4 and awaits renewed pressure on the foot switch. If there is not an error, the idle time is checked at stage 10 and if that should be less than a predetermined time, such as two seconds, the system returns to the track stage 8. If the period is greater, the system is halted, awaiting renewed pressure on the foot switch.

Figure 2:
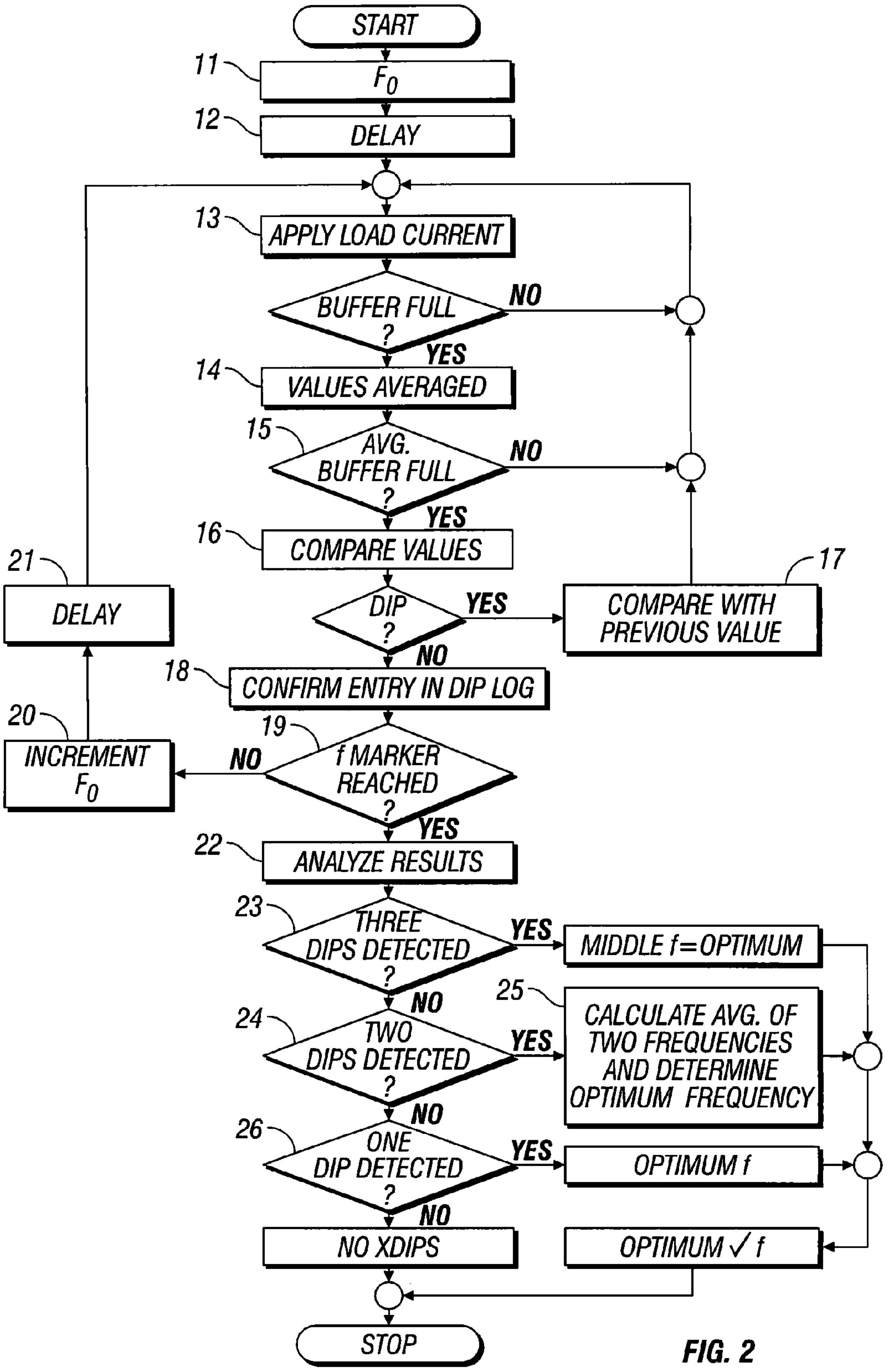
FIG. 2 shows schematically a flow chart of the system.

Referring now to FIG. 2, a flow chart of the scan system begins at stage 11, where a lower frequency marker is set as $F_o$.

After a delay at stage 12 of approximately 5 ms to allow the hardware to start up, a sample load current is applied at stage 13 using microcontroller ADC, and its value is stored in a sample buffer.

If the sample buffer is not full, the system returns to stage 13. If it is full, at stage 14 sample values Y(n) to Y(n-16), excluding the centre value Y(n-8), are averaged. The result is stored in the average buffer 15.

If the average buffer 15 is not full, the system returns again to stage 13. However, if the average buffer is full, Av(n-8) and Av(n-16) are compared to Y(n-8) at stage 16. If both averages Av(n-8) and Av(n-16) are higher than Y(n-8), it is concluded that a dip has been detected.

Then, in stage 17, if the centre sample value Y(n-8) is lower than the value previously logged the previous value is discarded and Y(n-8) and its frequency are logged in the dip log.

If the current dip log is non-zero then a dip has been detected. In stage 18, if there is no log of a dip within 100 Hz prior to the dip, this entry is confirmed in the log. If there is an entry within 100 Hz, the entry which yielded the lowest current is chosen and the other is discarded. This is confirmed as a valid dip, and the dip log buffer is incremented.

If the higher frequency marker has not been reached at stage 19, the system increments $F_o$ at stage 20, and after a delay at stage 21, the system returns to stage 13. When the higher frequency marker is reached at stage 19, the microscan finishes and the results are analyzed at stage 22.

At this point, if three dips have been detected at stage 23, it is concluded that the middle frequency is the optimum.

If not, and only two dips are detected at stage 24, the average of the two frequencies is calculated at stage 25. If the average is higher than the centre frequency marker then the conclusion is that the optimum frequency is the lower of the two detected dips. If the average is lower than the centre frequency marker then the conclusion is that the optimum frequency is higher of the two detected dips.

If only one dip is detected at stage 26, it can be concluded that this is the optimum frequency.

If no dips are detected the scan must have failed.

Figure 3:
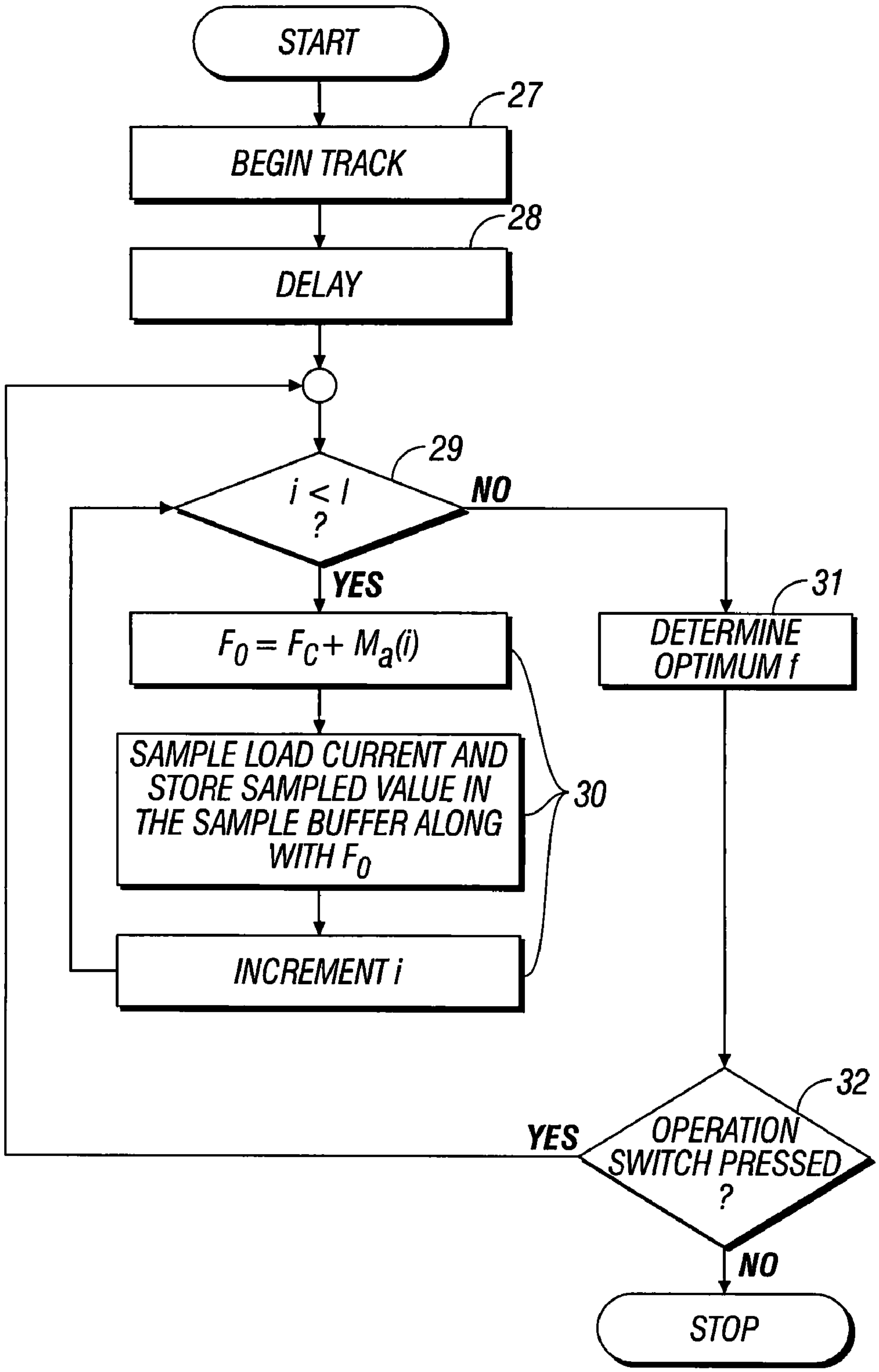
FIG. 3 shows schematically a tracking chart for the system.

Referring now to FIG. 3, which shows a tracking chart of the system, the track begins at stage 27, where the VCO is set to the optimum frequency as selected by the above microscan.

After a delay of say 5ms at stage 28 to allow the load to stabilize, the system enters a loop at stage 29, the loop 30 continuing until a variable i, which starts at zero and increments by one for each cycle of the loop 30, becomes greater than or equal to the length l of the modulating array.

In the loop 30, while i<l, the VCO frequency is set according to the equation:

$$F_o=F_c+M_a(i)$$

After waiting approximately 1 ms for the hardware to settle, the load current is sampled and the sampled value is stored in the sample buffer along with the frequency ($F_o$). The system then recycles to stage 29, incrementing i by one, and compares i and l once more.

When i has increments to ≧l, the conclusion at stage 31 is that the frequency which yielded the lowest load current is the optimum (from analysis of date in the sample buffer). $F_c$ is then set to this frequency.

If, at stage 32, the operating foot switch is still pressed, the system recycles to stage 29. If not, tracking is ended.

Figure 4:
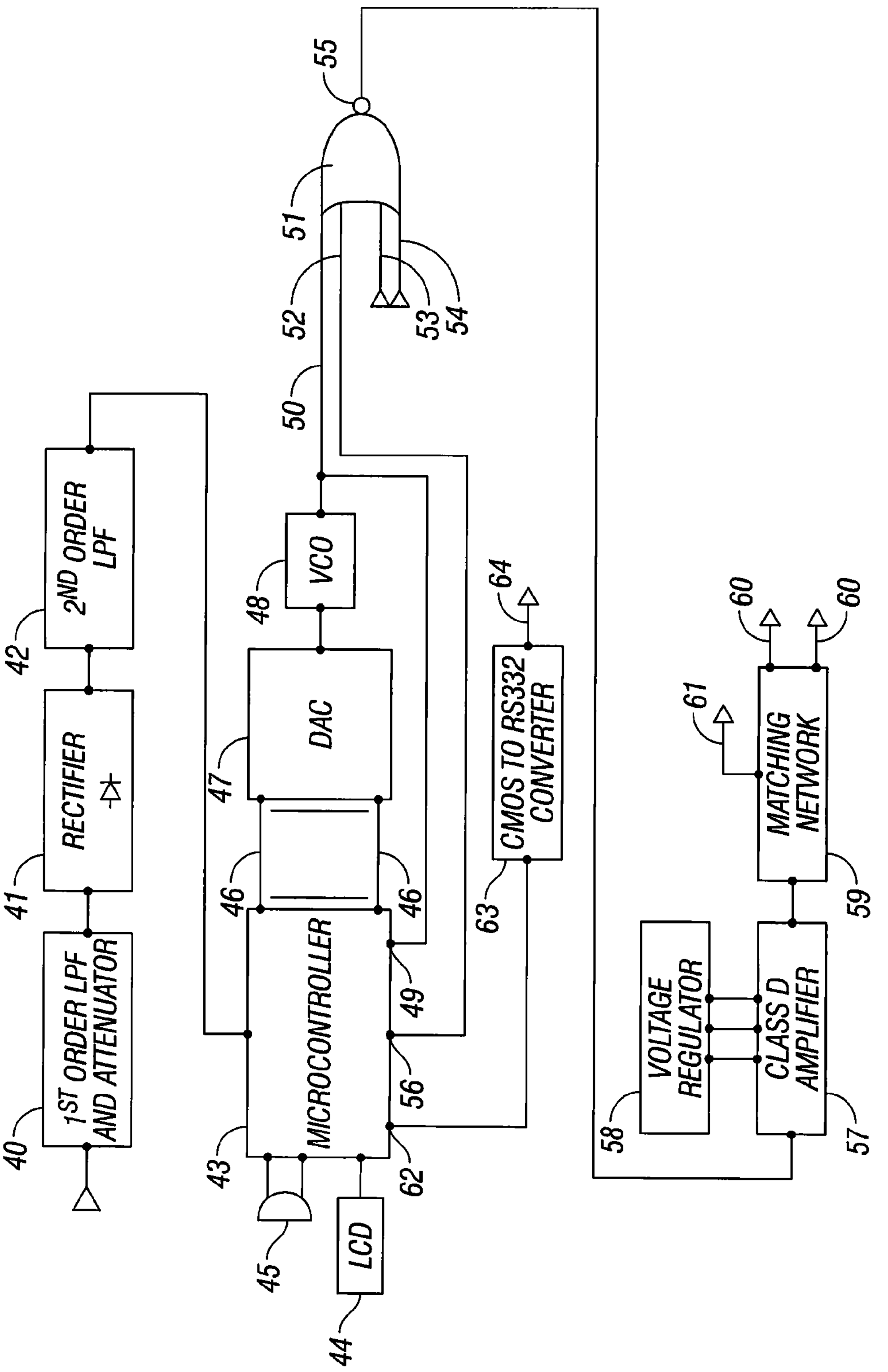
FIG. 4 is a schematic block diagram of a system embodying the invention.

Referring now to FIG. 4, the components of the control circuit are shown.

An AC feedback current is input to a $1^{st}$ order low pass filter and attenuator 40, then a precision rectifier 41 and a $2^{nd}$ order low pass filter 42. The resulting signal is then passed to a microcontroller 43 through its AN/IP 1 terminal.

A first set of outputs 46 from the microcontroller 43 emits a signal which forms a digital input for a DAC (digital analogue converter) 47. The output voltage $V_{out}$ of the DAC 47 forms the input voltage $V_{in}$ of the VCO 48 connected thereto. The output signal $F_{ou}$ of the VCO 48 is combined with a frequency count signal from a second output 49 of the microcontroller 43, and the combined signal is passed to a first input terminal 50 of a control gate 51. The control gate 51 has a second input terminal 52 connected to a third (EN) output 56 of the microcontroller 43, a third input terminal 53 connected to an amplifier overtemperature monitor, and a fourth input terminal 54 connected to the operating foot switch. Output terminal 55 off the gate 51 responds to the signals supplied and is connected to a Class D amplifier 57, and output signal from gate 51 becoming an input signal $F_{in}$ for the amplifier 57. The amplifier 57 is powered through an HT voltage regulator 58. Its output signal is passed to a matching network 59, which has +ve and −ve load outputs 60, and also emits a current feedback (AC) 61.

Then microcontroller 43 is provided with an LCD 44 for displaying error messages and preferably a buzzer 45 to alert a user in the case of errors. Via its fourth (UART) output 62, the microcontroller 43 is connected to a CMOS to RS332 converter 63, which has an RS232 port 64 for diagnostic signals.

While the invention has been illustrated with respect to several specific embodiments thereof, these embodiments should be considered as illustrative rather than limiting. Various modifications and additions may be made and will be apparent to those skilled in the art.

The invention claimed is:

1. A method of generating an ultrasonic signal comprising the steps of carrying out a first scan of the generated signal over a predetermined portion of the signal;

determining the number of resonance modes within the predetermined portion and the frequencies thereof;

selecting from said resonance modes that one mode which is at or nearest to a frequency central to said predetermined portion of the signal and;

setting scanning limits on each side of the selected resonance mode, wherein said scanning limits is a predetermined fraction of said predetermined portion of the signal.

2. A method as claimed in claim 1, wherein said predetermined fraction is one tenth.

3. A method as claimed in claim 1, further comprising the step of carrying out a second scan within said scanning limits to select an optimum frequency therewithin.

4. A method as claimed in claim 1, further comprising the step of tracking the selected resonance mode.

5. A method as claimed in claim 4, wherein such tracking accounts for frequency drifts due to thermal effects.

6. A method as claimed in claim 4, wherein such tracking accounts for frequency drifts due to changes in applied load.

7. A method as claimed in claim 1, further comprising the step of stopping generation of the signal in response to an error condition.

8. A method as claimed in claim 7, wherein the error condition comprises a discontinuous change in the frequency of the selected resonance mode.

9. A system for generating an ultrasonic signal, the system comprising:

means for generating ultrasonic vibrations; and control circuit means adapted for performing a method comprising the steps of carrying out a first scan of the generated signal over a predetermined portion of the signal;

determining the number of resonance modes within the predetermined portion and the frequencies thereof;

selecting from said resonance modes that one mode which is nearest to or at a frequency central to said predetermined portion of the signal; and setting scanning limits on each side of the selected resonance mode, wherein said scanning limits is a predetermined fraction of said predetermined portion of the signal.

10. A system as claimed in claim 9, further comprising at least one waveguide operatively connected to said generating means.

11. A system as claimed in claim 9, further comprising alerting means for alerting a user of errors during operation of the system.

12. A system as claimed in claim 9, wherein the ultrasonic vibrations are vibrations in a torsional mode.

13. A method of generating an ultrasonic signal comprising the steps of carrying out a first scan of the generated signal over a predetermined portion of the signal;

determining the number of resonance modes within the predetermined portion and the frequencies thereof, selecting from said resonance modes either that one mode which is at a central frequency or that mode at a frequency nearest thereto; and setting scanning limits on each side of the selected resonance mode, wherein said scanning limits cover less than one tenth of the frequency range of said predetermined portion.

14. A method as claimed in claim 13, wherein said scanning limits cover a frequency range substantially smaller than said predetermined portion.

15. A method as claimed in claim 13, further comprising the step of carrying out a second scan within said scanning limits to select an optimum frequency therewithin.

16. A method as claimed in claim 13, further comprising the step of tracking the selected resonance mode.

17. A method as claimed in claim 16, wherein such tracking accounts for frequency drifts due to thermal effects and changes in applied load.

18. A method as claimed in claim 13, further comprising the step of stopping generation of the ultrasonic signal in response to an error condition.

19. A method as claimed in claim 18, wherein the error condition comprises a discontinuous change in the frequency of the selected resonance mode.

* * * * *